Jan. 2, 1923. 1,440,580
O. E. BROWN.
NONSKID ATTACHMENT FOR VEHICLE TIRES.
FILED NOV. 7, 1921.
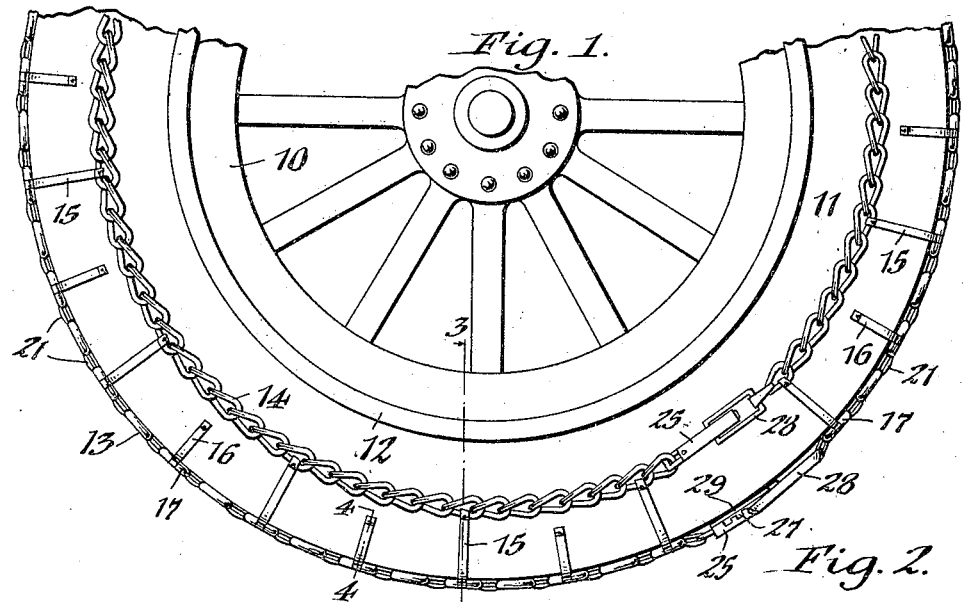
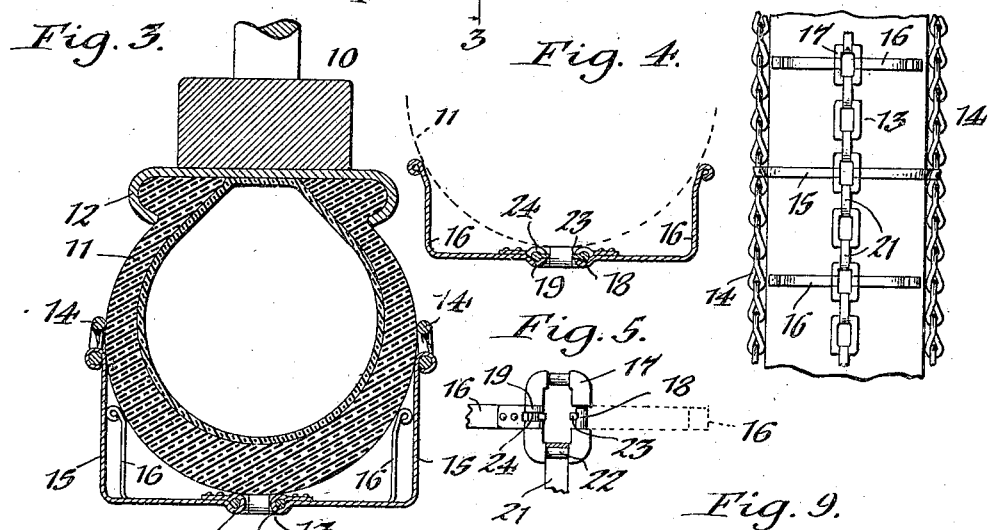
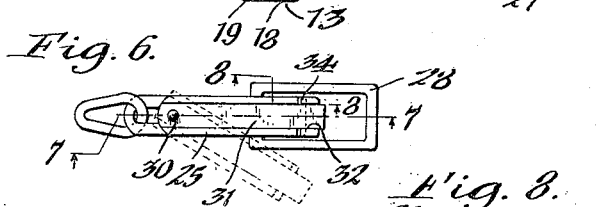
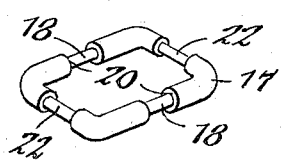
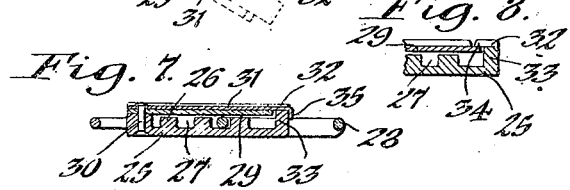
Inventor,
Oscar E. Brown,
by Geyer Popp
Attorneys.

Patented Jan. 2, 1923.

1,440,580

UNITED STATES PATENT OFFICE.

OSCAR E. BROWN, OF BUFFALO, NEW YORK.

NONSKID ATTACHMENT FOR VEHICLE TIRES.

Application filed November 7, 1921. Serial No. 513,249.

*To all whom it may concern:*

Be it known that I, OSCAR E. BROWN, a citizen of the United States, residing at Buffalo, in the county of Erie and State of New York, have invented new and useful Improvements in Nonskid Attachments for Vehicle Tires, of which the following is a specification.

This invention relates to a non-skid attachment for vehicle tires, and is applicable to either pneumatic or solid tires.

Its principal object is to provide an improved attachment of this character which will effectively prevent side skidding as well as spinning of the wheels of the vehicle.

Another object of the invention is to provide a simple and inexpensive non-skid attachment which may be readily applied to and removed from the tire and which is adjustable to suit tires of varying sizes.

In the accompanying drawings: Figure 1 is a fragmentary side view of a vehicle wheel showing the improvement applied thereto. Figure 2 is a fragmentary face view thereof. Figures 3 and 4 are enlarged transverse sections on the correspondingly numbered lines in Fig. 1. Figure 5 is a rear view of one of the links and associated parts. Figure 6 is an enlarged inner or rear view of the chain coupling. Figures 7 and 8 are longitudinal sections on the correspondingly numbered lines in Fig. 6. Figure 9 is a perspective view of one of the links of the tread chain.

Similar characters of reference indicate corresponding parts throughout the several views.

The improvement is shown as applied to an ordinary automobile wheel 10 having a pneumatic tire 11 mounted on the usual rim 12.

Extending circumferentially and centrally around the tread portion of the tire is an anti-skidding device or member which is preferably in the form of a chain 13, and extending circumferentially around either side of the tire is a supporting member or chain 14, which is disposed substantially midway between the thread and the rim 12, as shown in Figs. 1 and 2. The central tread chain 12 is connected with the two side chains 14, 14 by rigid means which not only prevent movement of the tread chain transversely of the tire but also serve to support the side-chains and hold them in position against the sides of the tire. The preferred means for accomplishing these results are illustrated in the drawings, and are constructed as follows:

Arranged at suitable intervals circumferentially of the tire on both sides thereof, are a plurality of rigid retaining members in the form of substantially L-shaped arms or connections 15 which are disposed transversely of the tire and attached at their inner ends to the corresponding side chain 14 and at their outer ends to the adjacent side of the tread chain 13. The inner ends of these arms are suitably attached to the side chains, while their outer ends are pivotally connected to a corresponding link of the tread chain, so as to permit these arms to rock inwardly and radially of the wheel should they strike an obstruction on the road. Alternating with these arms and also disposed transversely of the tire are a plurality of similar intermediate L-shaped arms 16, their outer ends being pivotally connected to a corresponding link of the tread chain, while their inner ends terminate short of the side chains and bear against the adjacent sides of the tire. These arms serve to prevent those portions of the thread chain between adjacent arms 15 from shifting transversely of the tire.

To hold both sets of arms 15 and 16 against movement on their links 17 circumferentially of the tire, the side bars of said links are provided with reduced portions 18 to which the pivot eyes or ends 19 of said arms are connected. These reduced portions form shoulders 20 against which the opposing edges of the pivot eyes of the arms abut. The several links of the thread chain 13 are preferably connected to one another by loops 21 which pass around reduced portions 22 formed in the cross bars of the respective links, as shown in Figs. 2, 4 and 9. By this construction, the pivot eyes of the arms 15, 16 and the loops 21 are flush with the body of the links of the chain, thereby producing a smooth running tread chain which effectively prevents side skidding and spinning of the wheel and in which there are no protruding parts liable to cut or otherwise injure the tire.

Without provision being made against it, the short, intermediate arms 16 would be allowed to swing by gravity away from the side of the tire, while at the lower side of the wheel. To prevent such a condition, the links 17 of these arms are provided on their side bars with inwardly projecting stop pins 23 and the pivot eyes 19 of said arms are provided with semi-circular slots 24 which receive said pins, as shown in Figs. 4 and 5. By this construction, each of the intermediate arms is prevented from swinging outwardly away from the sides of the tire by the inner end of its slot abutting against the corresponding stop pin 23, while the arm is free to swing inwardly toward the sides of the tire should the same strike an obstruction on the road.

Means are provided for adapting the tread and side chains to tires of varying sizes within a certain range. For this purpose, an adjustable coupling device is employed for connecting the opposing ends of each chain. As clearly shown in Figs. 6, 7 and 8, this coupling device preferably comprises a body portion 25 fastened at its rear end to one end of the chain and having a series of teeth 26 forming intervening notches or recesses 27 adapted to receive the front end of a comparatively long coupling link 28. Extending over the open ends of the recesses 27 is a laterally swinging retaining or cover plate 29 which is pivoted at 30 to the rear end of the coupling body. This retaining plate is provided with a spring catch, preferably consisting of a flat spring 31 which extends lengthwise thereof and projects beyond its front end, this projecting end being adapted to interlock with a recess 32 formed in a flange 33 at the front end of said coupling body, to prevent the plate from swinging laterally out of its operative position shown by full lines in the drawings. The front end of the retaining plate is adapted to interlock with or engage under a pair of rearwardly facing lips 34 formed at the corresponding end of the coupling body on opposite sides of the recess 32 thereof, whereby said plate is prevented from accidentally springing upward out of its operative position. The front end of the spring 31 may be provided with a depending flange 35 which covers the joint between it and the bottom of the recess 32 and excludes sand and dirt from the latter.

By this coupling device, the ends of the tread and side chains may be reliably and securely fastened together to suit tires of varying sizes by engaging the coupling link 28 with one or another of the recesses 27.

While both sets of arms 15, 16 serve to reliably retain the tread chain 13 centrally on the tread portion of the tire, the arms 15 also perform the additional function of supporting the side chains 14 which together with said last-named arms hold the tread chain upon the tire.

I claim as my invention:

1. A non-skid attachment for vehicle tires, comprising a non-skid member arranged circumferentially on the tread of the tire, supporting members arranged circumferentially on opposite sides of the tire, and a plurality of rigid connections arranged on opposite sides of the tire and secured at one end to said supporting members and pivotally connected at the other end to said non-skid member to permit the same to rock inwardly and radially of the wheel.

2. A non-skid attachment for vehicle tires, comprising a non-skid member arranged circumferentially on the tread of the tire, supporting members arranged circumferentially on opposite sides of the tire, and a plurality of L-shaped retaining arms disposed transversely of the tire and attached at their ends to said non-skid member and the corresponding supporting member.

3. A non-skid attachment for vehicle tires, comprising a non-skid member arranged circumferentially on the tread of the tire, supporting members arranged circumferentially on opposite sides of the tire, a plurality of spaced rigid connections disposed transversely of the tire and attached at their ends to said non-skid member and the corresponding supporting member, and intermediate connections arranged between said first-named connections and attached at one end to said non-skid member while their other ends engage the side of the tire adjacent to said supporting members.

4. A non-skid attachment for vehicle tires, comprising a non-skid member arranged circumferentially on the tread of the tire, supporting members arranged circumferentially on opposite sides of the tire, a plurality of rigid connections disposed transversely of the tire and attached at their ends to said non-skid member and the corresponding supporting member, intermediate connections alternating with said first-named connections and pivoted at one end to said non-skid member and bearing at their other ends against the sides of the tire, and means for limiting the movement of said intermediate connections away from the tire.

OSCAR E. BROWN.